(12) United States Patent
Ganapathiappan et al.

(10) Patent No.: US 8,784,548 B2
(45) Date of Patent: Jul. 22, 2014

(54) PHTHALOCYANINES AND NAPHTHALOCYANINES WITH NEAR-IR ABSORPTIONS FOR INKJET INKS

(75) Inventors: Sivapackia Ganapathiappan, Los Altos, CA (US); Jayprakash Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 13/383,718

(22) PCT Filed: Jul. 31, 2009

(86) PCT No.: PCT/US2009/052431
§ 371 (c)(1),
(2), (4) Date: Jan. 12, 2012

(87) PCT Pub. No.: WO2011/014188
PCT Pub. Date: Feb. 3, 2011

(65) Prior Publication Data
US 2012/0137927 A1    Jun. 7, 2012

(51) Int. Cl.
*C09D 11/02* (2014.01)
*C09B 47/12* (2006.01)
*C09B 47/18* (2006.01)
*C09B 47/22* (2006.01)

(52) U.S. Cl.
USPC ............ 106/31.49; 106/31.28; 540/129; 540/132; 540/133; 540/139; 540/140

(58) Field of Classification Search
CPC ...... C09D 11/328; C09B 47/18; C09B 47/20; C09B 47/22; C09B 47/24; C09B 69/108
USPC ............ 106/31.49, 31.28; 540/129, 132, 133, 540/139, 140
See application file for complete search history.

(56) References Cited

U.S. PATENT DOCUMENTS

| | | | | |
|---|---|---|---|---|
| 5,359,056 A * | 10/1994 | Kaieda et al. | ............. | 540/133 |
| 5,739,319 A | 4/1998 | Yamasaki | | |
| 7,470,315 B2 * | 12/2008 | Vonwiller et al. | ......... | 106/31.49 |
| 7,559,983 B2 * | 7/2009 | Starling et al. | ........... | 106/31.49 |
| 7,981,208 B2 * | 7/2011 | Kim et al. | ............... | 106/31.49 |
| 8,202,358 B2 * | 6/2012 | Ganapathiappan et al. | ........... | 106/31.49 |
| 8,226,757 B2 * | 7/2012 | Ganapathiappan et al. | ........... | 106/31.49 |
| 2006/0252927 A1 * | 11/2006 | Yamamoto et al. | ......... | 540/129 |
| 2007/0008393 A1 | 1/2007 | VonWiller et al. | | |
| 2007/0299257 A1 | 12/2007 | Vonwiller et al. | | |
| 2008/0199732 A1 * | 8/2008 | Lee et al. | ..................... | 540/140 |
| 2008/0257210 A1 * | 10/2008 | Baettig et al. | ............. | 106/31.49 |
| 2009/0117266 A1 * | 5/2009 | Kimura et al. | ............... | 427/160 |
| 2009/0155177 A1 * | 6/2009 | Baettig et al. | ................ | 540/129 |
| 2010/0286407 A1 * | 11/2010 | Kimura et al. | ................ | 548/402 |
| 2011/0204234 A1 * | 8/2011 | Ganapathiappan et al. | .. | 540/131 |

FOREIGN PATENT DOCUMENTS

| | | |
|---|---|---|
| JP | 01145194 | 6/1989 |
| JP | 05171085 | 9/1993 |
| JP | 2000353553 | 12/2000 |
| WO | WO-2007002980 A1 | 1/2007 |
| WO | WO-2008046129 A1 | 4/2008 |

OTHER PUBLICATIONS

Akdemir N et al: "Synthesis and properties of 1, 4-bis [N-(2-tolylsulphonylaminoethyl)]-1, 4-diazacyclohexane bridged network polymeric phthalocyanines", Dyes and Pigments, Elsevier Applied Science Publishers, Barking, GB, vol. 69, No. 1-2, Jan. 1, 2006.
Leznoff C C et al: "Syntheses of monometalated and unsymmetrically substituted binuclear phthalocyanines and a pentanuclear phthalocyanine by solution and polymer support methods", Journal of Organic Chemistry, ACS, US, vol. 56, No. 1, Jan. 4, 1991, pp. 82-90.
Manivannan V et al: "Electrochemistry and spectroelectrochemistry of polynuclear zinc phthalocyanines: formation of mixed valence cation radical species", Journal of Coordination Chemistry, Gordon & Breach Science Publ., London, GB, vol. 19, Feb. 1988.
Supplementary European Search Report, Jul. 8, 2013. EP Application No. 09847930.6.
Vigh S et al: "Synthesis and electrochemistry of linear and cofacial conjugated binuclear phthalocyanines covalently linked by alkyne and alkene bridges", Canadian Journal of Chemistry, NRC Research Press, CA, vol. 69, No. 9, May 27, 1991, pp. 1457-1461.

* cited by examiner

*Primary Examiner* — Helene Klemanski
(74) *Attorney, Agent, or Firm* — David W. Collins

(57) ABSTRACT

A water-soluble phthalocyanine dye or naphthalocyanine dye with near-infrared absorption comprises at least one complexed unit. Each unit comprises a phthalocyanine or a naphthalocyanine moiety and, optionally, a metal atom complexed thereto and, if present, having a valency of from 1 to 5, with two valencies complexed to the phthalocyanine ring or the naphthalocyanine ring. Each unit has two linker moieties on opposite sides or adjacent sides of the unit, wherein water-soluble groups are present on at least one of the linkers, on the metal atom, and optionally on the phthalocyanine or naphthalocyanine moiety.

18 Claims, No Drawings

PHTHALOCYANINES AND NAPHTHALOCYANINES WITH NEAR-IR ABSORPTIONS FOR INKJET INKS

BACKGROUND ART

Inkjet printers are now very common and affordable and allow one to obtain decent print quality. They are used in home printing, office printing and commercial printing. In inkjet printers, print heads are used to eject ink droplets very accurately to place them on a desired location on a medium. The print head normally comprises a large number of nozzles, often, more than 400 nozzles. As a general rule, the larger the number of nozzles, the greater is the improvement of the print quality and speed. Frequently, the nozzles become blocked because of the usage of pigmented inks or inks containing particles. Sometimes, one or more nozzle orifices may contain dried ink and fresh ink cannot be ejected. One result of this condition is the formation of streaks, which lead to poor print quality.

Near-infrared (near-IR) absorbing dyes may be added to the ink to monitor the condition of the nozzles. Other applications for such dyes exhibiting absorption in the near-IR include security printing, counterfeit assessment, RFID tags, etc. Near-IR absorbing dyes may be employed by extending the conjugation so that the absorption can be shifted to the range of 700 to 1000 nm range.

Many of the technologies utilizing near-IR materials require that these materials be dissolved in organic solvents, water and aqueous or organic solvent blends. Some applications, such as thermal inkjet printing require that the near-IR absorbing material be kept in aqueous solution for long periods of time. Near-IR dyes have to be stable in aqueous solvent blends for a long time without undergoing any kind of chemical change. Any degradation or changes to its physical/chemical nature can destroy the conjugation and thus lose the near-IR absorption. Such changes could adversely affect the desired property (absorption in the near-IR wavelength range) and cannot be used in such applications. Near-IR dyes of the Cyanine dye class are soluble in water but are chemically unstable in aqueous solutions over long time at wide pH range and are therefore not suitable for inkjet applications requiring aqueous solution stability for long time.

Phthalocyanine (PC) and naphthalocyanine (NPC) (metal free or metal complex) are chemically stable but are difficult to solubilize in water. Highly ionic groups or water-soluble ethylene oxide groups have to be attached for dissolving these compounds in water. These compounds are solubilized by attaching water-soluble groups on the benzene rings. But introduction of such groups changes the peak absorption dramatically up to 60 nm.

DETAILED DESCRIPTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "vehicle" or "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. As such, the term "aqueous liquid vehicle" or "aqueous vehicle" refers to a liquid vehicle having water as a major solvent, and often, a predominant solvent.

The term "near infrared" or "near-IR" refers to optical radiation in the range of about 700 nm to 1400 nm. In accordance with embodiments of the present invention, the near-IR dyes of the present disclosure can absorb optical radiation within the near-IR spectrum, and in one embodiment, in the 700 nm to 1000 nm range.

As used herein, "colorant" can include dyes, pigments, and/or other particulates that may be suspended or dissolved in an ink vehicle prepared in accordance with embodiments of the present invention. Dyes are typically water-soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle. It is noted that the term "colorant" does not include the near-IR dyes described in accordance with embodiments of the present disclosure, e.g., near-IR dyes generally described in Formulae (I)-(XIV) below.

The term "about" when referring to a numerical value or range is intended to encompass the values resulting from experimental error that can occur when taking measurements.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of about 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As indicated above, current near-IR absorbing compounds are either not sol-uble in water or not very stable in water or inks. Methods for making such compounds are also difficult. In accordance with the teachings herein, the synthesis of near-IR absorbing compounds that are water-soluble or dispersed and that are very stable in water and other solutions such as inkjet ink formulation with a wide range of pH is improved. Only a small quantity has to be used for the desired application as these compounds exhibit very strong absorption in the near-IR region.

As mentioned above, phthalocyanine (PC) and naphthalocyanine (NPC) (metal free or metal complex) are chemically stable but are difficult to solubilize in water. Highly polar groups like sulfonates, phosphates or water-soluble ethylene oxide groups have to be attached for dissolving these compounds in water. Attachment of water-soluble groups such as sulfonates in the benzene or naphthalene ring structure changes the absorption significantly. It has been learned that it is better to keep the PC and NPC ring structure intact while incorporating the water-soluble groups on the side chain. Moreover small molecules can crystallize easily out of the solution. This leads to the reduction in absorption with time. Amorphous materials are required to solve this issue. Normally, polymers are more stable and amorphous in nature than small molecules under identical conditions. Such water soluble groups can include carboxylate, amides, imidazoles, poly(ethylene glycols), amines, and sulfonates.

The embodiments herein are directed to the design and synthesis of unique water-soluble PC and NPC dye chromophores as part of the backbone in the poly-mers to maintain their absorption so that near-IR absorption can be in the 700 to 1000 nm range. These polymeric dyes are chemically stable in water as well as aqueous solvent blends at wide pH range and are best suited for water-based ink-jet ink applications. Stability is achieved by incorporating water-soluble groups containing moieties as linkers for the PC and NPC structures. The polymeric nature reduces the crystalline nature of the materials. This avoids the crystallization of the near-IR dyes. The polymeric nature increases the amorphous nature as well as increases the thermal and chemical stability under a variety of environments.

The water-soluble phthalocyanine dyes or naphthalocyanine dyes with near-infrared absorption comprise at least one unit. Each unit comprises a phthalocyanine or a naphthalocyanine moiety and, optionally, a metal atom complexed thereto. Each metal atom, if present, has a valency of one to five complexed to the phthalocyanine ring or the naphthalocyanine ring and water-soluble groups are present in the linked groups between PC and NPC as well as optionally on one or more benzene or naphthalene rings. Further, each complexed unit has at least two linker moieties, wherein water-soluble groups are present on at least one of the linkers.

There are two primary embodiments associated with the inks disclosed herein. In the first primary embodiment, low molecular weight polymers containing phthalocyanines and naphthalocyanines units with near-IR absorption for inkjet inks are provided. In the second primary embodiment, polymers containing phthalocyanines and naphthalocyanines units prepared by condensation polymerization with near-IR absorption for inkjet ink applications are provided. These two embodiments, and variants thereof, are discussed below.

A. Low Molecular Weight Polymers Containing Phthalocyanines and Naphthalocyanines Units with Near-IR Absorption for Inkjet Inks General structures of water-soluble dyes are disclosed here in which the water-soluble groups are present not on the PC or NPC ring structures, but rather on at least one linker between monomeric units ("non-PC unit" or "non-NP unit"). However, water-soluble groups may be present on the PC or NPC ring structures in addition to being present on one or more of the linkers.

Formulae (I) and (II) illustrate examples polymeric phtalocyanines with water-soluble groups present on the non-PC unit (Formula (I)) and on both the non-PC unit and on the PC structure (Formula (II)):

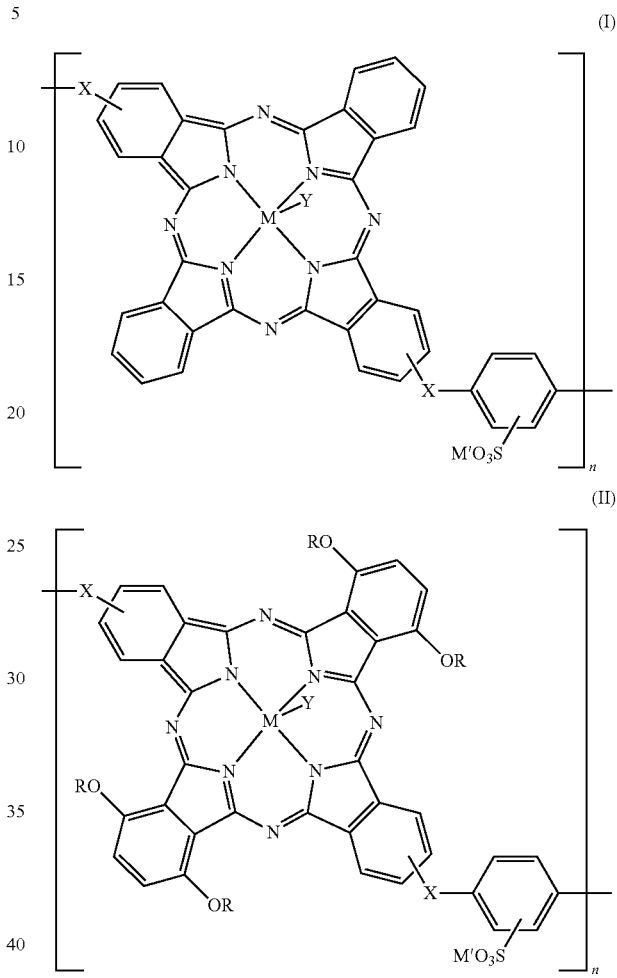

Formulae (III)-(VI) illustrate examples polymeric naphthalocyanines with water-soluble groups present on the non-NPC unit (Formula (III)) and on both the non-NPC unit and on the NPC structure (Formula (IV)-(VI)):

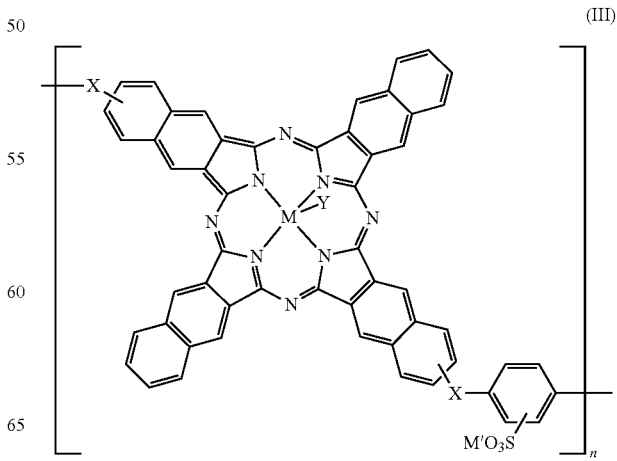

-continued

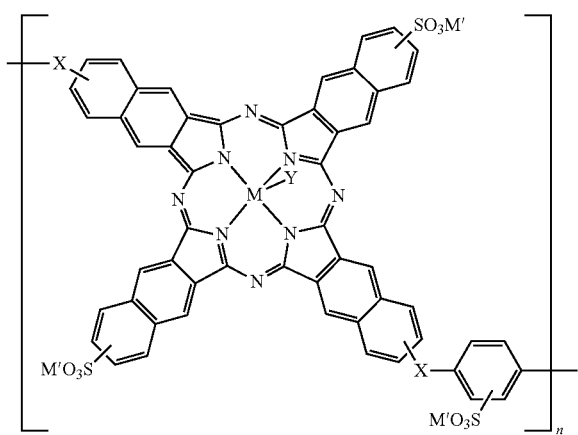

(IV)

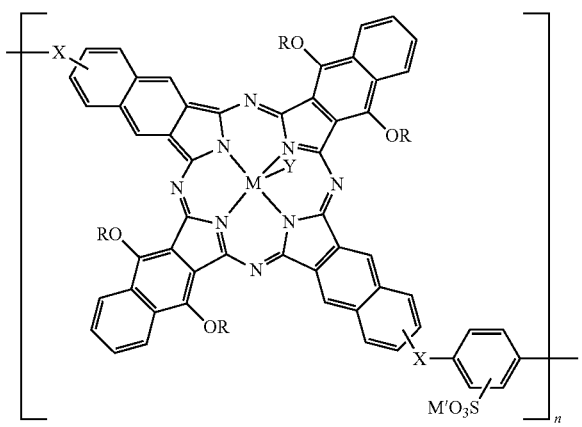

(V)

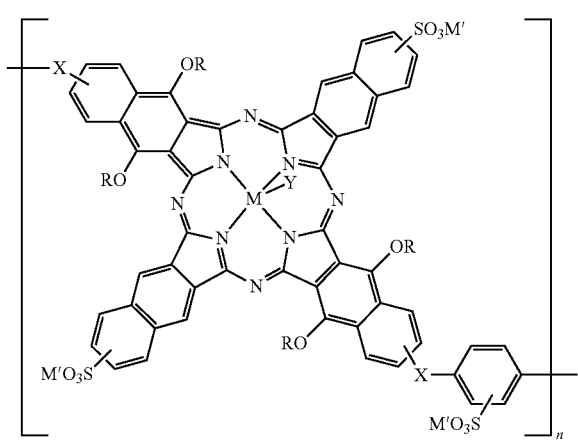

(VI)

For Formulae (I)-(VI):

X=O, NH, CH$_2$ or CO;

Y=halogen (Cl or Br), OH, OCOR; COOZ, SO$_3$Z, PO$_3$Z, NR$_4^+$, O(CH$_2$CH$_2$O)$_m$CH$_3$ (m=1 to 500);

Z=H, monovalent metal ions (e.g., Na$^+$, K$^+$) or NR$_4^+$;

R=H, alkyl or substituted alkyl;

the number of Y groups depends upon the valency of the metal atom M. If M is trivalent, then only one Y group is present; if M is tetravalent, then there will be two Y groups; if M is quintavalent, then there will be three Y groups;

M=either metal-free or any metal from the Periodic Table with valency from 1 to 5;

M'=H, Li, Na, K, Rb or Cs; and n=1 to 50.

Examples of M include copper, indium, gallium, thallium, germanium, tin, antimony, bismuth, cobalt, nickel, silicon, titanium, titanyl, vanadium, vanadyl, chromium, manganese, yttrium, scandium, zirconium, niobium, molybdenum, ruthenium, rhodium, hafnium, tantalum, zinc, manganese, magnesium, beryllium, aluminum and bismuth.

It will be noted that the linker is the X group (O, NH, CH$_2$ or CO) and that the water-soluble group is a sulfonate, bonded to a neighboring X group in the adjacent unit.

The molecule further includes the water-soluble or water-insoluble group Y complexed to the M atom, for valencies of M greater than 2. Further, water-soluble groups (e.g., OR, —SO$_3$M') may also be included on the PC or NPC ring structure, Examples of water-insoluble Y groups include, but are not limited to, Cl, Br, OCOCH$_3$, OCOCH$_2$CH$_3$, OCH$_3$, OC$_2$H$_5$, OCOCH$_3$ and OC$_8$H$_{17}$. Generally these types of compounds have to be made in two steps first making the PC/NPC-containing moiety. At this time, these water-insoluble groups are present since preparation starts with the metal containing these groups. The second step is to introduce water-soluble groups. During the time of converting the water-insoluble groups on the PC/NPC molecule it to the water-soluble groups, the above water-insoluble groups may not all be converted to the water-soluble form because of incomplete reaction. That is why it is being carried away to the final product. Examples of water-soluble groups include, but are not limited to, OSO$_3$ Na$^+$, OSO$_3$K$^+$ and OSO$_3$NH$_4^+$.

These near-IR dyes are prepared from the corresponding PC and NPC compounds. First, those PC or NPC derivatives are formed. Then, the derivative is treated with 1,4-bis(chloromethyl benzene) or ter-phthaloyl chloride by Friedel-Crafts reaction. Then, sulfonation is carried out with sulfur trioxide or chlorosulfonic acid. At the same time, some of the sulfonated derivatives of PC or NPC compounds are subjected to the above reactions to obtain a controlled sulfonated and linear polymer.

The foregoing Formulae (I)-(VI) have the linkers on opposite sides of the monomeric repeat unit, which leads to a linear polymer. In some embodiments, the linkers may be on adjacent sides, on three sides, or on all four sides, leading to branched or network structures.

Formulae (VII) and (VIII) below illustrate branched and network structures, respectively, obtained where the linkers are on three sides and on four sides, respectively:

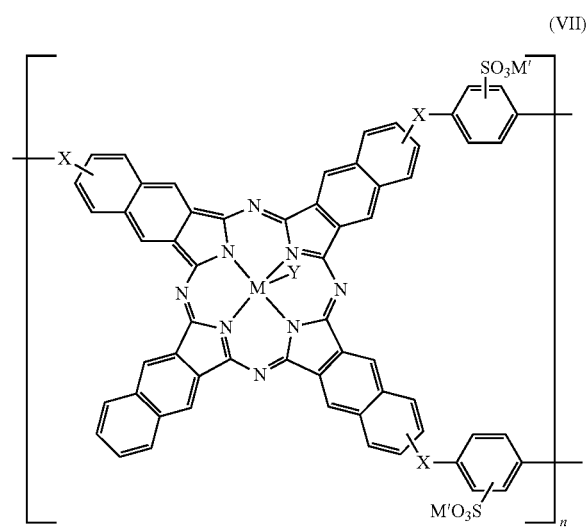

(VII)

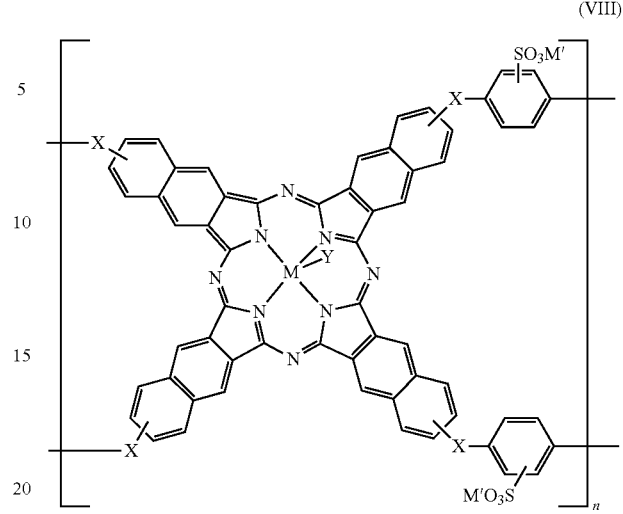

(VIII)

B. Polymers Containing Phthalocyanines and Naphthalocyanines Units Prepared by Condensation Polymerization with Near-IR Absorption for Inkjet Ink Applications As above, general structures of water-soluble dyes are disclosed here in which the water-soluble groups are present on at least one linker between monomeric units, and may also be present on the PC or NPC ring structures.

Specifically, Formulae (IX) and (X) depict general structures of polymeric phthalocyanines with water-soluble groups present on the non-PC unit:

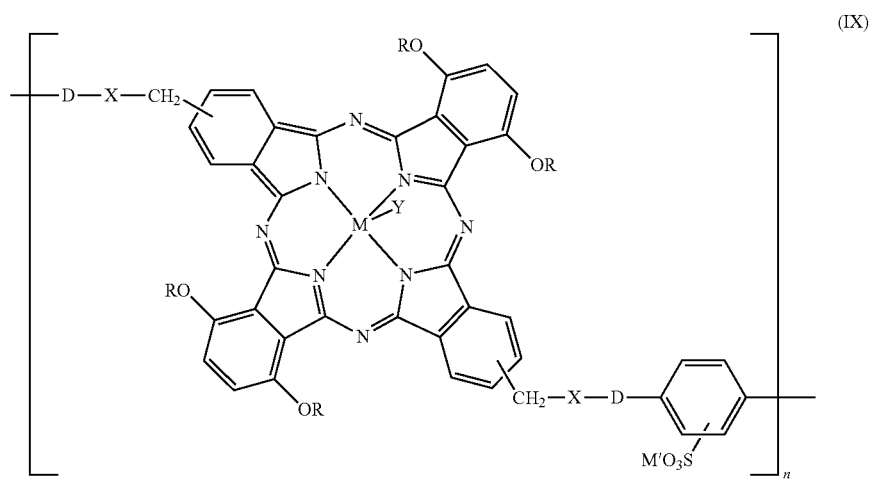

(IX)

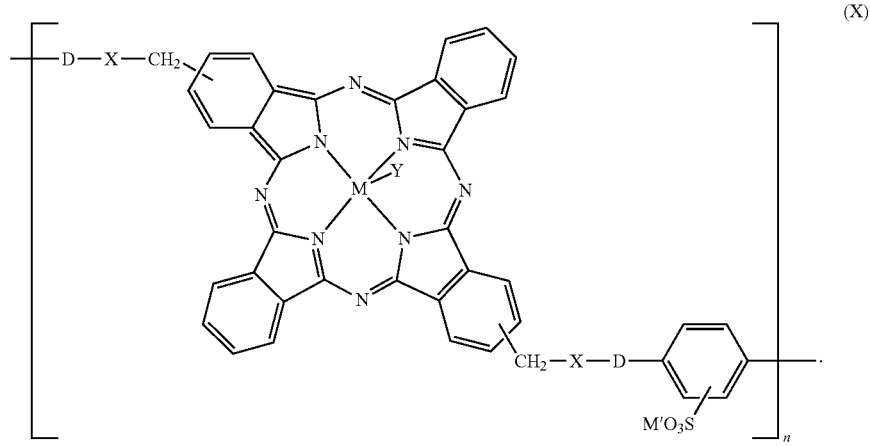

(X)

Formula (XI) depicts the general structure of polymeric naphthalocyanines with water-soluble groups present on the non-NPC unit:

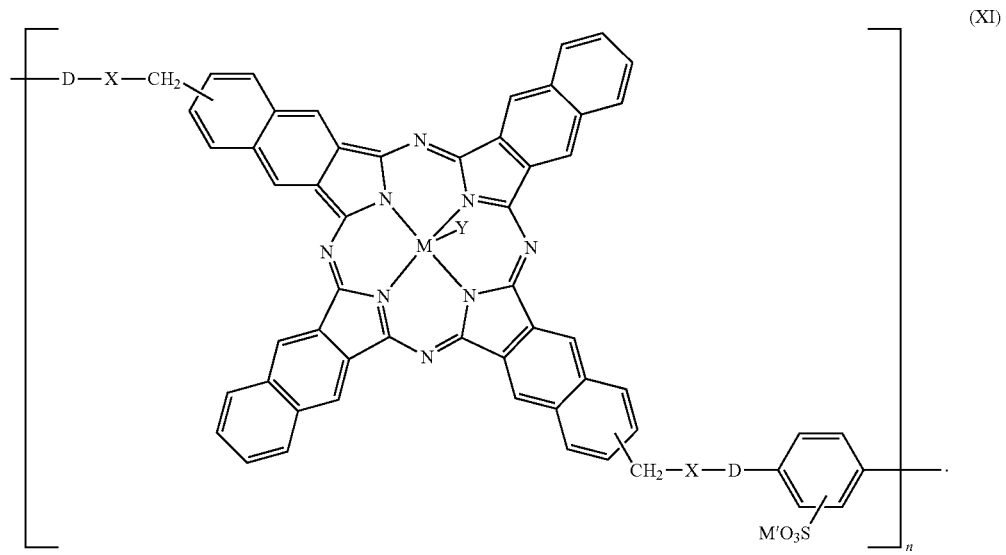

(XI)

Formula (XII) depicts the general structure of polymeric naphthalocyanines with water-soluble groups present on both NPC and non-NPC units:

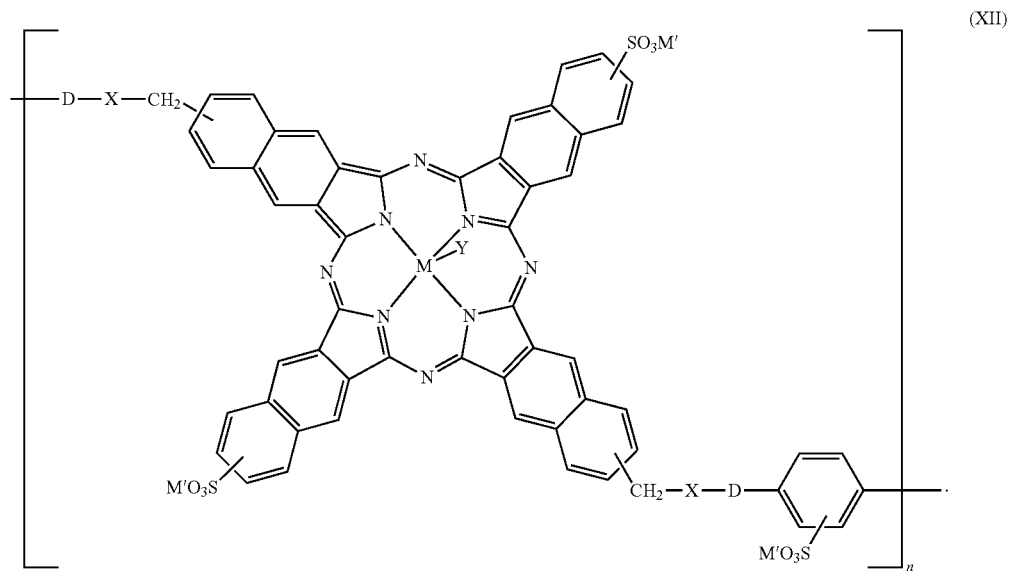

(XII)

Formulae (XIII) and (XIV) depict the general structures of polymeric naphthalocyanines with water-soluble groups present on both NPC and the non-NPC unit with some organic substituents on NPC ring:

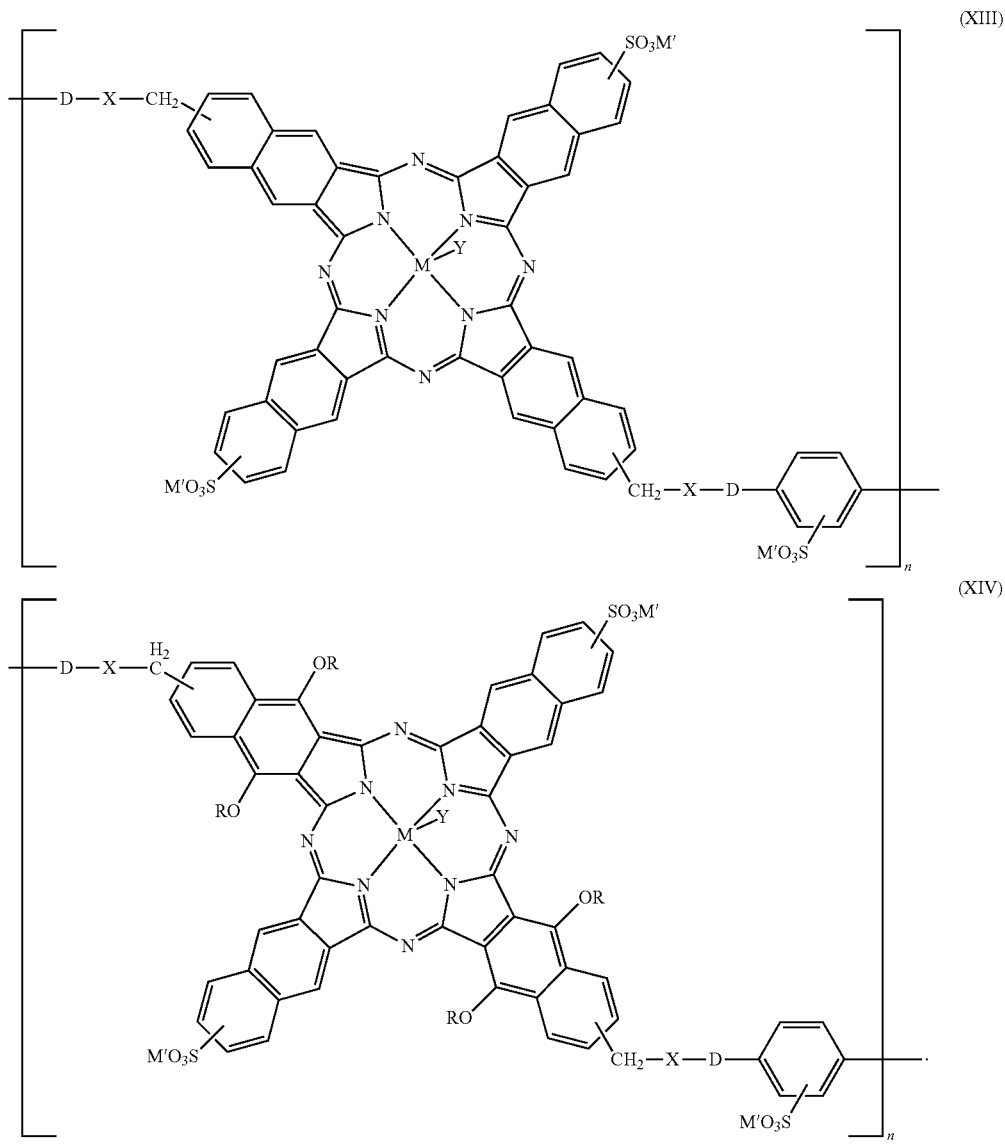

For Formulae (IX)-(XIV):

X=O or NH;

Y=halogen (Cl or Br), OH, OCOR; COOZ, $SO_3Z$, $PO_3Z$, $NR_4^+$, $O(CH_2CH_2O)_mCH_3$ (m=1 to 500);

Z=H, monovalent metal ions (e.g., $Na^+$, $K^+$) or $NR_4^+$;

D=single bond, CO or $CH_2$;

R=H, alkyl or substituted alkyl;

The number of Y groups depends upon the valency of the metal atom M. If M is trivalent, then only one Y group is present; if M is tetravalent, then there will be two Y groups; if M is quintavalent, then there will be three Y groups;

M=either metal-free or any metal from the Periodic Table with valency from 1 to 5;

M'=H, Li, Na, K, Rb or Cs; and n=1 to 50.

Examples of M include copper, indium, gallium, thallium, germanium, tin, antimony, bismuth, cobalt, nickel, silicon, titanium, titanyl, vanadium, vanadyl, chromium, manganese, yttrium, scandium, zirconium, niobium, molybdenum, ruthenium, rhodium, hafnium, tantalum, zinc, manganese, magnesium, beryllium, aluminum, and bismuth.

It will be noted that in this case, the linker is the $CH_2$—X-D group (where X=O or NH and D=single bond or $CH_2$) and that the water-soluble group is again a sulfon-ate, bonded to a neighboring D group in the adjacent unit.

The molecule further includes the water-soluble or water-insoluble group Y complexed to the M atom, for valencies of M greater than 2. Further, water-soluble groups (e.g., OR, —$SO_3M'$) may also be included on the PC or NPC ring structure. As indicated above, examples of water-insoluble Y groups include, but are not limited to, Cl, Br, $OCOCH_3$, $OCOCH_2CH_3$, $OCH_3$, $OC_2H_5$, $OCOCH_3$ and $OC_8H_{17}$, while examples of water-soluble groups include, but are not limited to, $OSO_3Na^+$, $OSO_3K^+$ and $OSO_3NH_4^+$.

These dyes are prepared from the corresponding PC and NPC compounds. First, the PC or NPC derivatives are formed. Then the derivative is chloromethylated by a conventional organic reaction method. These chloromethylated derivatives of PC or NPC compounds are treated with nucleophiles, such as shown in Formulae (XV)-(XVI) below to obtain low molecular weight polymers. If the nucleophile contains sulfonate or other water-soluble groups, then there is no need to further treatment. If the nucleophile does not contain water-soluble groups, then they can be sulfonated to obtain a controlled sulfonated and linear polymer. These polymeric compounds are soluble in water and are stable.

The foregoing Formulae (VII)-(XII) have the linkers on opposite sides of the monomeric repeat unit, which leads to a linear polymer. In some embodiments, the linkers may be on adjacent sides, on three sides, or on all four sides, leading to branched or network structures, such as Formulae (VII) and (VIII) shown above.

Formulae (XV) and (XVI) are examples of nucleophiles with and without water-soluble groups that can react with chloromethylated PCs and NPCs.

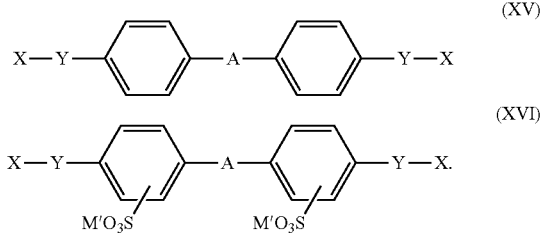

C. Considerations Relating to Inks

In addition to the near-infrared absorbing compounds described herein as well as the inks containing such compounds, the present disclosure provides a method of printing such compounds and inks. In one embodiment, a method of printing any of the near-infrared absorbing compounds described herein can comprise printing an ink-jet ink containing the near-infrared absorbing compound with an ink-jet printer.

Generally, ink-jet printers contain ink-jet ink print heads that are used to eject ink droplets accurately at precise locations on print media. As such, ink-jet printers can contain from several nozzles in the print head to more than 400 nozzles. A high population of nozzles can increase the print quality and speed of the ink-jet printing. However, frequently, the nozzles get blocked because of the usage of pigmented inks or inks containing particles, such as binders, resins, latexes, etc. As such, streaks can occur, which leads to poor print quality.

As such, ink-jet printers having near-infrared absorbing compounds in the ink-jet ink can be coupled to a detection system used to monitor nozzle health. Generally, the detection system monitors the ink ejected from the nozzles by detecting the near-infrared absorbing compound in the ink-jet ink. If the detection system fails to detect the near-infrared absorbing compound, the printer can ascertain that such nozzle is blocked or otherwise faulty and adjust the printing by using a different nozzle(s), thereby maintaining print quality and performance.

Additionally, the present ink-jet inks can provide security features. The present near-infrared absorbing compounds can be tailored to absorb specific wavelengths. Once an ink-jet ink has been manufactured with a near-infrared absorbing compound described herein, such an ink can be characterized by determining the absorption of the ink in the near-infrared wavelength region. After such information is determined and catalogued, the ink-jet ink can be printed and subsequently verified for its particular absorption. The ink could then be used to determine the authenticity of the print.

Additionally, the present near-infrared absorbing compounds can provide increased stability by increasing the extinction coefficient of the near-infrared absorbing compounds. As such, the present near-infrared absorbing compounds allow for an ink-jet ink formulation having a smaller quantity of the near-infrared absorbing compounds, leading to lower production costs.

The inks of the present disclosure can be used with commercially available ink-jet printers, such as DESKJET® or PHOTOSMART® and other similar printers manufactured by Hewlett-Packard Company. It is notable that these inks are acceptable for use with both thermal ink-jet ink printers and piezo ink-jet printers. They can also be used with off-axis printers, which have a high demand with respect to maintaining a reliable ink with low incidences of clogging. Further, these ink sets can produce true colors on a variety of media, including uncoated media, clay coated media, inorganic porous coated media, e.g., silica- and alumina-based media, and organic swellable media, e.g., gelatin coated media, each with improved light fastness, gamut, and other print quality enhancements.

As previously discussed, the inks of the present invention can include a col-orant in the form or a dye and/or pigment. In one embodiment, the ink can be a black ink, cyan ink, magenta ink, yellow ink, pale cyan ink, pale magenta ink, green ink, blue ink, orange ink, pink ink, gray ink, etc. Additionally, multiple inks can be used to form an ink set for use with the printers described herein. As such, a printer can have from one to multiple dyes in a single ink, each having more than one dye load, and/or multiple dyes in over an ink set. Some or all of the inks in an ink set can additionally include the near-IR dyes described herein, or an ink might include a near-IR dye described herein without the presence of another colorant. The typical colorant range is about 0.1% to 6% by weight of the total ink composition.

A typical liquid vehicle formulation that can be used with a dye set of the present invention can include one or more organic co-solvent(s), present in total at from 5.0% to 50.0% by weight, and one or more non-ionic, cationic, and/or anionic surfactant(s), present from 0.01% to 10.0% by weight. The balance of the formulation can be purified water, or other vehicle components known in the art such as biocides, viscosity modifiers, pH adjusting agents, sequestering agents, preservatives, anti-kogation agents, bleed control agents, drying agents, jettability agents, and the like.

The concentration of the PC and NPC dyes disclosed herein for use in the foregoing typical formulation ranges from about 0.0001% to 1% by weight of the ink, in addition to colorant (dyes and/or pigments) described above. In some embodiments, the concentration of the PC and NPC dyes may range from about 0.005% to 0.5% by weight of the ink. The concentration of the PC and NPC dyes depends on the extinction coefficient of the dye for detection. If the extinction coefficient of the PC or NPC dye is comparatively high, then a lower dye concentration may be employed.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include 2-pyrrolidinone, derivatized 2-pyrrolidinone including 1-(2-hydroxyethyl)-2-pyrrolidinone, 2-methyl-1,3-propanediol, tetraethylene glycol, and ethylhydroxypropanediol (EHPD), to name a few.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Specific examples of preferred surfactants for use include SOLSPERSE, TERGITOL, DOWFAX, and the like. The amount of surfactant added to the formulation, if included, may range from 0.01% to 10.0% by weight.

Consistent with the formulation of this invention, various other additives may be employed to optimize the properties of the ink composition for specific applications. Examples of these additives are those added to inhibit the growth of harmful microorganisms. These additives may be biocides, fungicides, and other anti-microbial agents, which are routinely used in ink formulations. Examples of suitable microbial agents include, but are not limited to, NUOSEPT, UCARCIDE, VANCIDE, PROXEL, and combinations thereof.

Sequestering agents, such as EDTA (ethylenediaminetetraacetic acid), may be included to eliminate the deleterious effects of metal impurities. Such sequestering agents, if present, typically comprise from 0.01 wt % to 2 wt % of the ink-jet ink compositions. Viscosity modifiers may also be present, as well as other additives known to those skilled in the art to modify properties of the ink as desired. Such additives can be present in the ink-jet ink compositions at from 0 wt % to 20 wt %.

Various buffering agents or pH adjusting agents can also be optionally used in the ink-jet ink compositions of the present invention. Typical pH adjusting agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components. If used, pH adjusting agents typically comprise less than about 10 wt % of the ink-jet ink composition. Similarly, buffering agents can be used such as, but not limited to, TRIS, MOPS, citric acid, acetic acid, MES, etc. If used, buffering agents typically comprise less than about 3 wt % of the ink-jet ink composition and generally from about 0.01 wt % to 2 wt %, most commonly from 0.2 wt % to 0.5 wt %, Additionally, anti-kogation agents that can be used include lithium phosphate, sodium phosphate, phosphate esters of fatty alcohol alkoxylates, and the like, in amounts from about 0.01 wt % to 5 wt %.

EXAMPLES

Example 1

Indium phthalocyanine chloride (10 parts) is mixed with 1,4-bis(chloromethyl benzene) (2 parts). Then aluminum chloride (2 parts) is added to the above mixture and heated to 90° C. for 10 h. The mixture is cooled and washed with cold water to remove all the soluble materials to obtain a polymer product.

Example 2

Preparation of Water Soluble Product

The polymer product obtained from Example 1 is dissolved with fuming sulfuric acid containing 20% sulfur trioxide and maintained at ambient temperature for 24 h. This mixture is poured in crushed ice and dialyzed against water with a dialysis membrane tubing of molecular weight cut off 1000 for 3 days. The dialyzed solution is collected and pH is adjusted to 7.2 with sodium carbonate. Water is removed to obtain the water-soluble product containing near-IR dye.

What is claimed is:

1. A water-soluble phthalocyanine dye or naphthalocyanine dye with near-infrared absorption comprising at least one complexed unit, each unit comprising a phthalocyanine or a naphthalocyanine moiety and, optionally, a metal atom complexed thereto, each metal atom, if present, having a valency of from 1 to 5, with two valencies complexed to the phthalocyanine ring or the naphthalocyanine ring, each unit having two linker moieties on opposite sides or adjacent sides of the unit, wherein water-soluble groups are present in at least one of the linkers between the phthalocyanine or naphthalocyanine moiety and optionally on the phthalocyanine or naphthalocyanine moiety, wherein at least one linker moiety is bonded to a second phthalocyanine or naphthalocyanine moiety.

2. The dye of claim 1 comprising up to 50 complexed units.

3. The dye of claim 1 wherein the metal atom is present and the dye further includes at least one water-soluble group complexed to the metal atom.

4. The dye of claim 1 wherein the dye further includes water-soluble groups on the phthalocyanine or the naphthalocyanine moiety.

5. The dye of claim 4 wherein the water-soluble groups are selected from the group consisting of carboxylate, amides, imidazoles, poly(ethylene glycols), amines and sulfonates.

6. The dye of claim 1 wherein the linker is on opposites sides of each unit to provide a linear polymer, wherein the linker is on three sides of each unit to provide a branched polymer, or wherein the linker is on four sides of each unit to provide a network structure.

7. The dye of claim 1 wherein either the linker moiety comprises —X—, where X is $CH_2$ or CO, and wherein the water-soluble group is a sulfonate, bonded to a neighboring X group in an adjacent unit or the linker moiety comprises -D-X—$CH_2$—, where D is a single bond or $CH_2$ and X is O or NH, and wherein the water-soluble group is a sulfonate, bonded between the D group of one complexed unit and a neighboring D group in an adjacent unit.

8. The dye of claim 7 wherein the linker moiety comprises —X and the dye is selected from the group consisting of phthalocyanine dyes and naphthalocyanine dyes having water-soluble axial ligands having a general structure given by any of Formulae (I)-(VI):

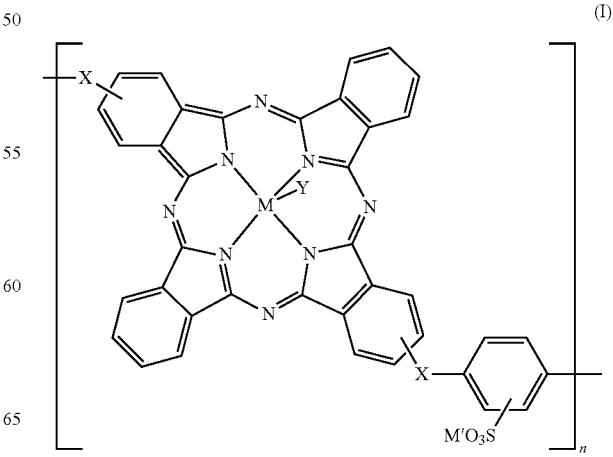

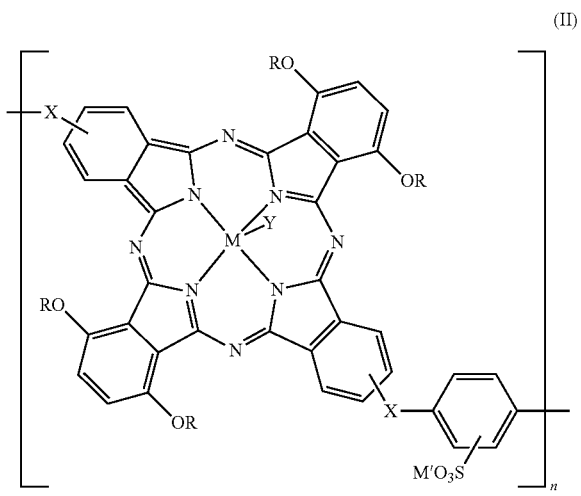
(II)

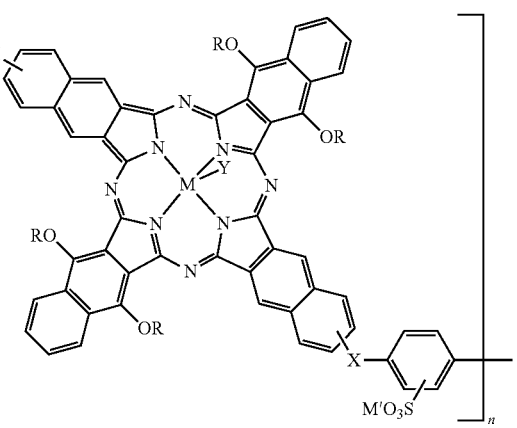
(V)

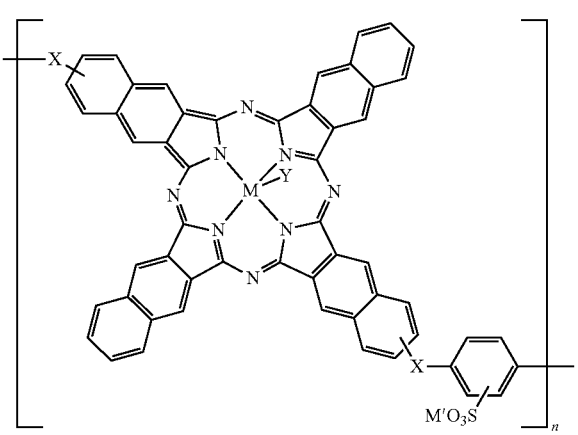
(III)

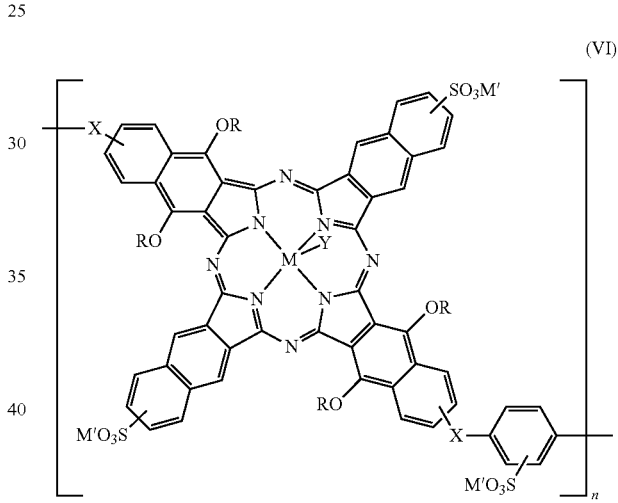
(VI)

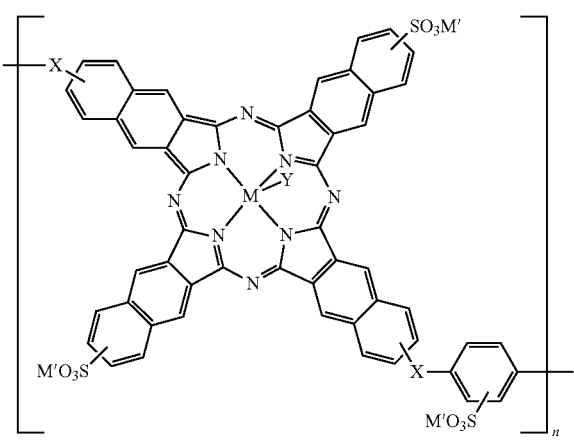
(IV)

where:

X=O, NH, CH$_2$ or CO;

Y=halogen, OH, OCOR; COOZ, SO$_3$Z, PO$_3$Z, NR$_4^+$, O(CH$_2$CH$_2$O)$_m$CH$_3$; m=1 to 500;

Z=H or monovalent metal ions;

R=H, alkyl or substituted alkyl;

the number of Y groups depends upon the valency of the metal atom M;

M=either metal-free or any metal from the Periodic Table with valency 1 to 5;

M'=H, Li, Na, K, Rb or Cs; and n=1 to 50.

9. The dye of claim 7 wherein the linker moiety comprises -D-X—CH$_2$— and the dye is selected from the group consisting of phthalocyanines and naphthalocyanines having extended conjugation and water-soluble axial ligands having a general structure given by any of Formulae (IX)-(XIV):

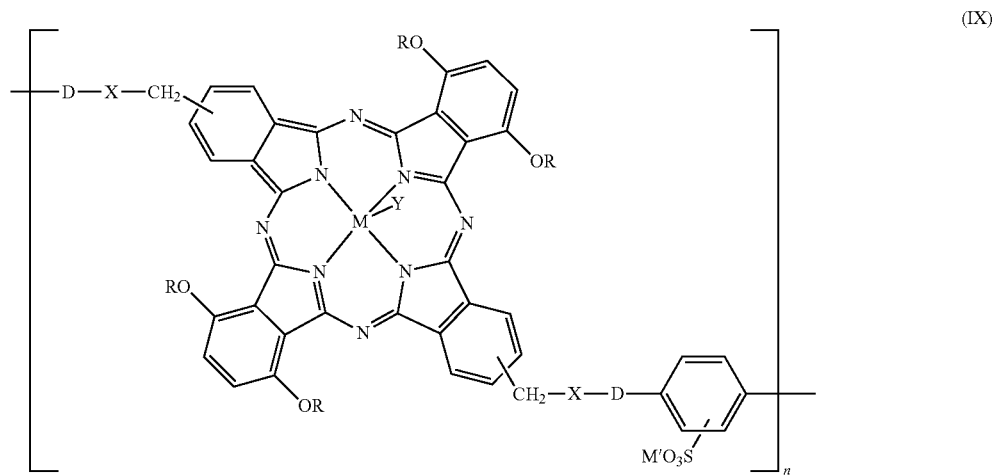
(IX)
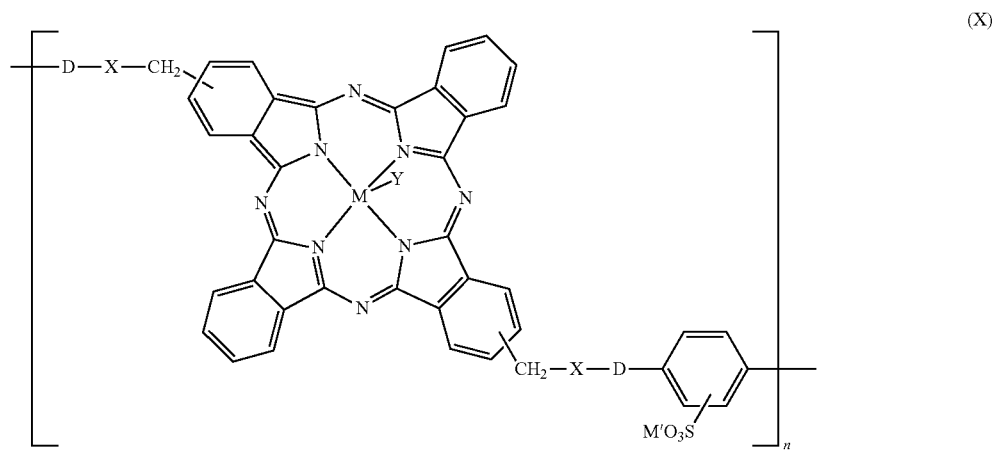
(X)
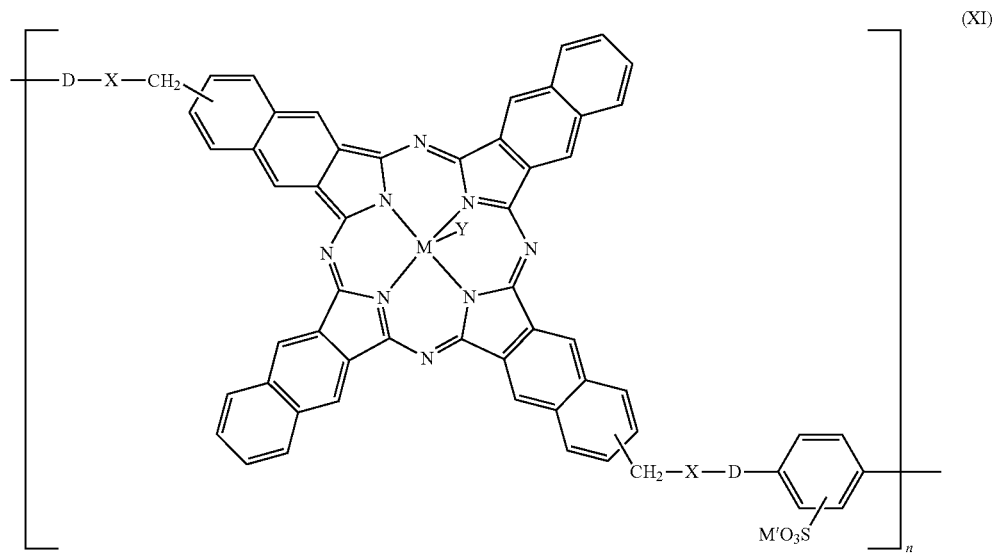
(XI)

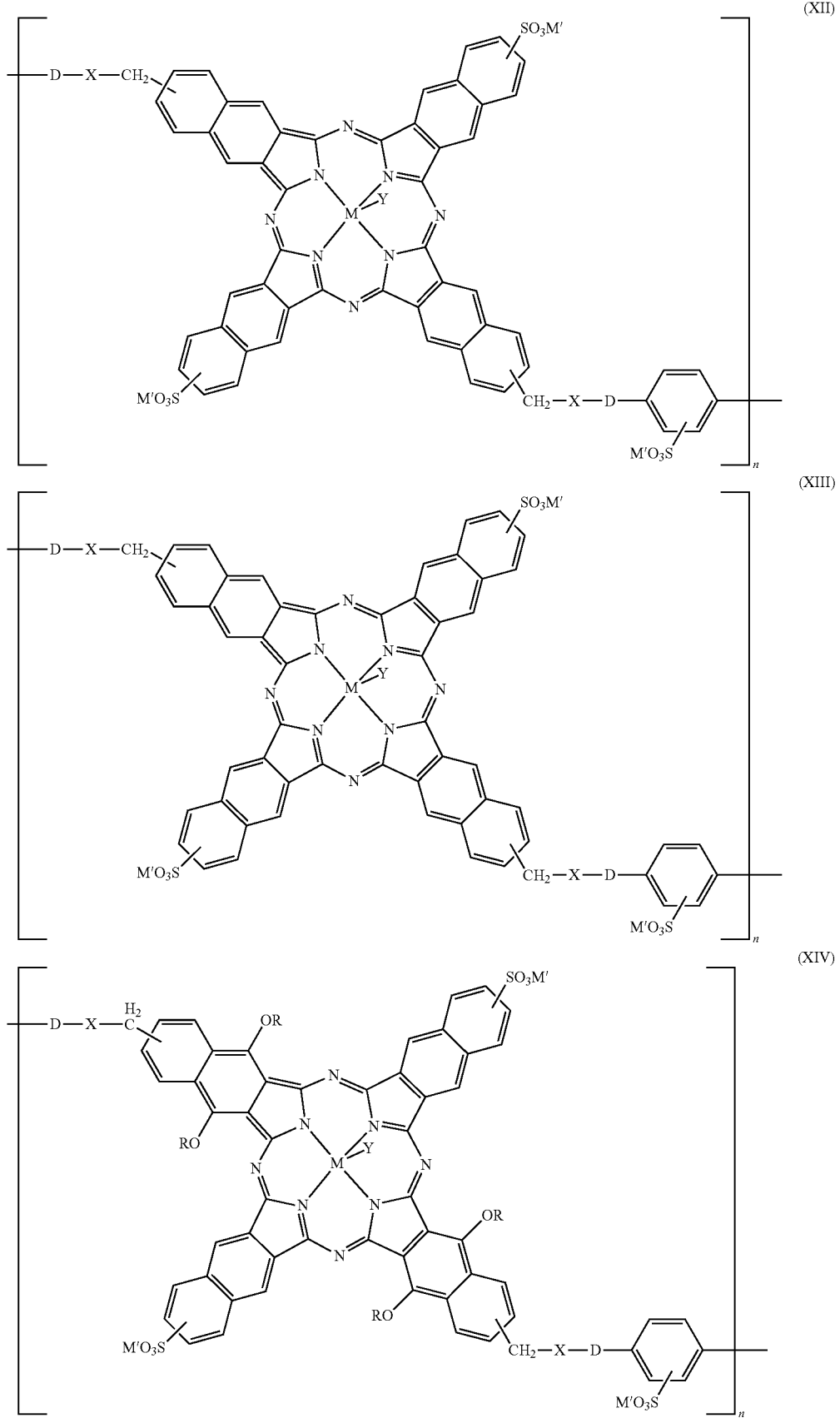

where:

X=O or NH;

Y=halogen, OH, OCOR; COOZ, $SO_3Z$, $PO_3Z$, $NR_4^+$, $O(CH_2CH_2O)_mCH_3$; m=1 to 500;

Z=H or monovalent metal ions;

D=single bond, CO or $CH_2$;

R=H, alkyl or substituted alkyl;

the number of Y groups depends upon the valency of the metal atom M;

M=either metal-free or any metal from the Periodic Table with valency of 1 to 5;

M'=H, Li, Na, K, Rb or Cs; and n=1 to 50.

10. The dye of claim 8 wherein Z is selected from the group consisting of $Na^+$, $K^+$ and $NR_4^+$.

11. The dye of claim 8 wherein the number of Y groups on the metal atom is one if M is trivalent, two if M is tetravalent, or three if M is quintavalent.

12. The dye of claim 8 wherein M is copper, indium, gallium, thallium, germanium, tin, antimony, bismuth, cobalt, nickel, silicon, titanium, titanyl, vanadium, vanadyl, chromium, manganese, yttrium, scandium, zirconium, niobium, molybdenum, ruthenium, rhodium, hafnium, tantalum, zinc, manganese, magnesium, beryllium, aluminum, and bismuth.

13. The dye of claim 12 wherein M is indium, gallium, or thallium.

14. The dye of claim 9 wherein Z is selected from the group consisting of $Na^+$, $K^+$ and $NR_4^+$.

15. The dye of claim 9 wherein the number of Y groups on the metal atom is one if M is trivalent, two if M is tetravalent, or three if M is quintavalent.

16. The dye of claim 9 wherein M is copper, indium, gallium, thallium, germanium, tin, antimony, bismuth, cobalt, nickel, silicon, titanium, titanyl, vanadium, vanadyl, chromium, manganese, yttrium, scandium, zirconium, niobium, molybdenum, ruthenium, rhodium, hafnium, tantalum, zinc, manganese, magnesium, beryllium, aluminum, and bismuth.

17. The dye of claim 16 wherein M is indium, gallium, or thallium.

18. An inkjet ink formulation comprising:
    (a) an aqueous vehicle;
    (b) at least one dye or pigment; and
    (c) the dye of claim 1.

* * * * *

UNITED STATES PATENT AND TRADEMARK OFFICE
CERTIFICATE OF CORRECTION

PATENT NO. : 8,784,548 B2  
APPLICATION NO. : 13/383718  
DATED : July 22, 2014  
INVENTOR(S) : Sivapackia Ganapathiappan et al.

Page 1 of 1

It is certified that error appears in the above-identified patent and that said Letters Patent is hereby corrected as shown below:

In The Claims

In columns 21-22, line 3, in Claim 9, delete "

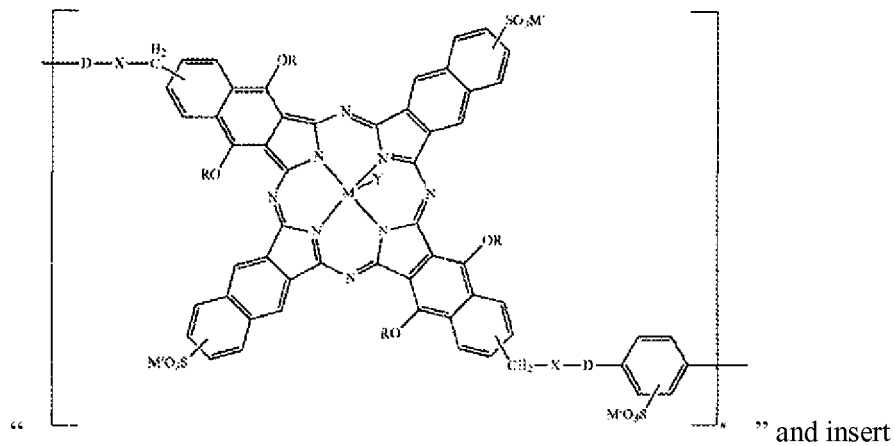

" and insert

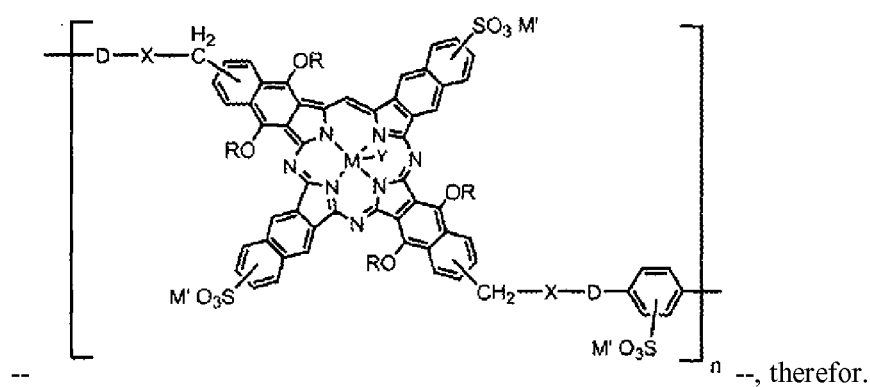

--, therefor.

Signed and Sealed this  
Tenth Day of March, 2015

Michelle K. Lee  
*Deputy Director of the United States Patent and Trademark Office*